Feb. 13, 1968   C. L. JOHNSON   3,368,349
GAS TURBINE ENGINE FUEL SYSTEM
Filed June 20, 1966
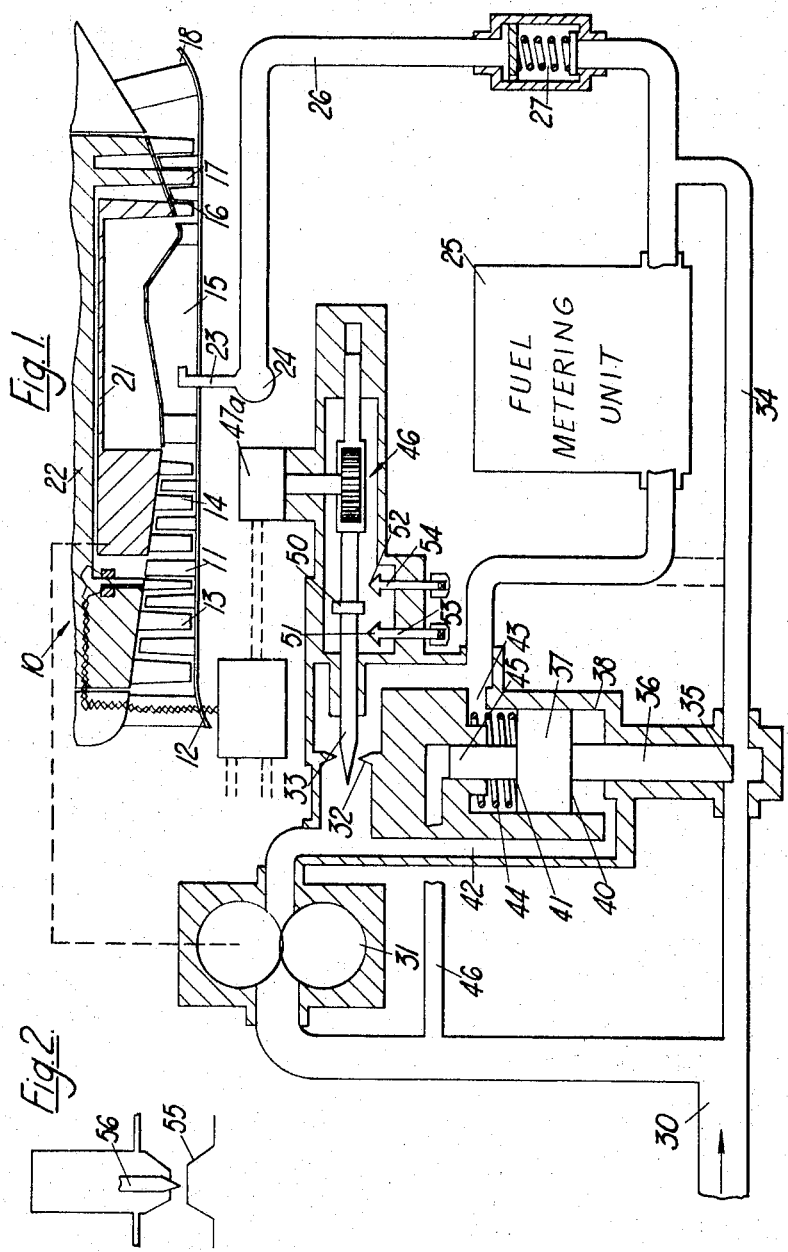
Inventor
Christopher Linley Johnson
By
Cushman, Darby & Cushman
Attorney

United States Patent Office 3,368,349
Patented Feb. 13, 1968

3,368,349
GAS TURBINE ENGINE FUEL SYSTEM
Christopher Linley Johnson, Allestree, Derby, England, assignor to Rolls-Royce Limited, Derby, England, a British company
Filed June 20, 1966, Ser. No. 558,843
Claims priority, application Great Britain, July 9, 1965, 29,321/65
12 Claims. (Cl. 60—39.28)

ABSTRACT OF THE DISCLOSURE

An improved gas turbine engine fuel system is described wherein a governor means acts independently of a fuel supply control unit to prevent a predetermined variable from exceeding a first given value. The governor means is pressure operated and may comprise a spill valve for controlling a bypass flow of fuel through a spill conduit in response to pressure produced by an engine driven positive displacement fuel pump. The governor means functions to prevent a predetermined variable from exceeding a first given value. An adjustment means is provided for adjusting the first given value, and limit means are provided for preventing such an adjustment of the governor as would cause the predetermined variable to fall below a second given value under the action of the governor means.

---

This invention concerns a gas turbine engine fuel system.

According to the present invention, there is provided a gas turbine engine fuel system comprising a fuel supply control unit having a metering orifice for controlling the supply of fuel to the engine in accordance with a plurality of different variables, a governor which acts on the fuel passing to or from the metering orifice so as to prevent a predetermined engine variable from exceeding a first given value, governor adjustment means for adjusting the governor so that the fuel control exercised thereby is responsive to at least one other engine variable, such adjustment adjusting the said first given value, and limit means for preventing the governor from being adjusted by the governor adjustment means to such an extent that the value of the said predetermined engine variable will fall below a second given value, under the action of the governor alone.

The term engine variables as used in this specification is to be taken to mean dependent variables which are a measure of conditions within the engine. Thus shaft speeds, gas temperatures and gas pressures are engine variables. Functions (for example $N/\sqrt{T_1}$ wherein N is the speed of a low pressure shaft, and $T_1$ is the mean temperature of the engine air intake) relating such shaft speeds, temperatures and pressures to each other and to other variables such as inlet conditions are also engine variables.

The more general term "variables" includes engine variables and also embraces independent variables such as inlet conditions or throttle lever position.

The governor may comprise a constant displacement pump which is adapted to be driven by the engine, a spill conduit through which part of the flow from the said pump may pass back to the low pressure side thereof, and a spill valve which controls the flow through the spill conduit in accordance with the value of the pressure produced by the pump.

Thus, the governor may comprise a control orifice through which passes the flow from said pump, the spill valve controlling the flow through the spill conduit in accordance with the value of the pressure drop across the control orifice, and the spill conduit receiving fuel which has passed through the control orifice.

The spill conduit preferably communicates with the downstream side only of the metering orifice of the fuel supply control unit, although it may alternatively communicate with the upstream side thereof.

Preferably the spill valve is urged by resilient means towards the closed position and has two oppositely disposed pressure surfaces one of which is open to the pressure on the upstream side of the control orifice, which pressure tends to move the spill valve towards the open position, the other pressure surface being open to the pressure on the downstream side of the control orifice.

The governor adjustment means may comprise means for adjusting the size of the control orifice. Thus, the means for adjusting the size of the control orifice may comprise a control valve, the said limit means limiting travel of the control valve.

The control valve may, for example, be provided with an abutment which is disposed between and is engageable selectively with two limit stops.

The control valve is preferably positionable by an actuator which is responsive to the said at least one other engine variable.

The actuator may, for example, be responsive to the rotational speed of a low pressure shaft of the engine, the pump being adapted to be driven by a high pressure shaft of the engine. The actuator may, moreover, be responsive to at least one engine temperature.

The actuator is preferably an electronic actuator which is adapted to receive signals representative of the value of at least one engine variable, means being provided for advancing the phase of said signals so that the control valve is moved in accordance with said phase-advanced signals.

The invention also comprises a gas turbine engine provided with a fuel system as set forth above.

The invention is illustrated, merely by way of example, in the accompanying drawings, in which:

FIGURE 1 is a diagrammatic view of a gas turbine engine provided with a fuel system in accordance with the present invention, and FIGURE 2 illustrates a modification of the said fuel system.

In FIGURE 1 there is shown a gas turbine jet propulsion engine 10 having an engine casing 11 in which there are arranged, in flow series, an air inlet 12, a low pressure compressor 13, a high pressure compressor 14, combustion equipment 15, a high pressure turbine 16, and a low pressure turbine 17, the turbine exhaust gases being directed to atmosphere through a jet pipe 18. The high pressure compressor 14 and the high pressure turbine 16 are mounted on a common high pressure shaft 21 within which there is concentrically mounted a low pressure shaft 22 to which are secured the low pressure compressor 13 and the low pressure turbine 17.

The combustion equipment 15 is supplied with fuel by way of a plurality of angularly spaced apart fuel injectors 23 which communicate with a common annular manifold 24. The annular manifold 24 is supplied with fuel from the metering orifice 25 of a fuel supply control unit via a conduit 26 which incorporates a back pressure valve 27.

The size of the metering orifice 25 is adjusted (by means not shown) in accordance with the value of a plurality of different variables. These variables may, for example, include the rotational speed of the low pressure shaft 22, a pressure or pressure ratio related to pressures or pressure ratios prevailing in one of the compressors 13, 14, and a temperature such as the mean temperature prevailing in the jet pipe 18.

The metering orifice 25 receives its fuel from a tank or other reservoir (not shown) via a supply conduit 30. Connected, in flow series, in the supply conduit 30 are a positive displacement gear pump 31, which is driven by the high pressure shaft 21, and a control orifice 32. Extending through the control orifice 32 is a needle valve or other control valve 33.

As will be appreciated, the pressure on the high pressure side of the pump 31 will depend upon the speed of the high pressure shaft 21 and, for any given position of the needle valve 33, the pressure drop across the control orifice 32 will be proportional to the square of the speed of the high pressure shaft 21 multiplied by the density of the fuel being employed.

A spill conduit 34 comunicates, as indicated by full lines, with the downstream side only of the metering orifice 25, although it could alternatively, as indicated by dotted lines, communicate with the upstream side thereof. In either case, of course, the spill conduit 34 will receive fuel which has passed through the control orifice 32. The spill conduit 34 communicates with the low pressure side of the pump 31, a spill valve 35 being provided which controls the proportion of the flow from the high pressure side of the pump 31 which may pass back through the spill conduit 34 to the low pressure side of the pump 31.

The fuel supply control unit also incorporates a spill valve (not shown) which regulates the pressure drop across the said metering orifice 25, spill flow from the said spill valve returning to the inlet of the pump 31 through an additional spill conduit (not shown).

The spill valve 35 is constituted by an end of a piston rod 36 carrying a piston 37 which is slidably mounted in a cylinder 38. The piston 37 has oppositely disposed pressure surfaces 40, 41 of equal area, of which the surface 40 is open via a conduit 42 to the pressure on the upstream side of the control orifice 32. The pressure acting on the pressure surface 40 tends to move the spill valve 35 towards the open position.

The pressure surface 41 is open via a conduit 43 to the pressure on the downstream side of the control orifice 32. Accordingly, the spill valve 35 will control the flow through the spill conduit 34 in accordance with the value of the pressure drop across the control orifice 32.

A spring 44 acts on the pressure surface 41 so as resiliently to urge the spill valve 35 towards the closed position. The piston rod 36 has, moreover, an end 45 which is remote from the spill valve 35 and which is open via a conduit 46 to fuel from the low pressure side of the pump 31, this low pressure fuel urging the spill valve 35 towards the closed position.

The pressures acting across the opposite ends of the piston rod 36 are balanced, so that they do not interfere with the operation of the piston 36. The spill valve 35 will thus open when the pressure drop across the control valve 32 exceeds the load of the spring 44.

The needle valve 33 is positionable, via a rack and pinion device 46 and a servomotor 47a, by an electronic actuator 47. Both the servomotor and the electronic actuator may be of a conventional type. The actuator 47 receives signals representative of the speed of the low pressure shaft 22 and of the values of the mean temperatures ($T_1$, $T_7$), prevailing at the air intake 12 and in the jet pipe 18. The actuator 47 may also be responsive to other variables including, for example, one or more compressor temperatures. The actuator 47 incorporates means for advancing the phase of the said signals, the needle valve 33 being positioned in accordance with these phase-advanced signals. These phase-advanced signals, which tend to prevent "hunting," may thus control the position of the needle valve 33 in accordance with the speed N of the low pressure shaft 22, modified if necessary by $T_1$ to give a limiting value of $N/\sqrt{T_1}$, or alternatively, in accordance with the temperature $T_7$ modified if required in functional dependence on $T_1$. Both speed and temperature control would preferably be provided, but the signal calling for the lowest engine speed would have overriding authority at any time.

The needle valve 33 is provided with an abutment 50 which is disposed between and is engageable selectively with conical heads 51, 52 of adjustable limit stops 53, 54 respectively. As will be appreciated, the stop 54 limits the extent to which the area of the control orifice 32 may be increased, and thus constitutes a limit for the permissible top speed of the high pressure shaft 21. Similarly, the limit stop 53 limits the extent to which the control orifice 32 may be reduced in size and thus constitutes a limit to the extent to which, in operation the speed of the high pressure shaft 21 may be allowed to fall under the control of spill valve 35 alone.

In operation, the pump 31 will pump fuel at a pressure related to the speed of the high pressure shaft 21 which drives the pump 31. If the speed of the high pressure shaft 21 should exceed a first given value, the pressure drop across the control orifice 32 will rise, with the result that the spill valve 35 will open against the action of the spring 44. This will permit fuel to pass from the downstream side of the metering orifice 25 and through the spill conduit 34 to the low pressure side of the pump 31. The fuel supply to the combustion equipment 15 will thus be reduced and an emergency governor will thus be provided which prevents the high pressure shaft 21 from exceeding the given value. Such an emergency governor needs to be provided in order to control the engine at high altitudes if the metering orifice 25 should fail in the fully open position.

When the fuel supply to the combustion equipment 15 is reduced in the above way, the speed of the high pressure shaft 21 is reduced. Consequently, the output pressure of the pump 31, and the pressure drop across the control orifice 32, will both also be reduced. The spring 44 will then tend to close the spill valve 35. Thus, the effect of the spill valve 35 on high pressure shaft speed is fed back to the spill valve by means of a pressure signal generated by the pump 31. Accurate and predetermined control of high pressure shaft speed is thus obtained.

When the abutment 50 engages the limit stop 54, the device works as an emergency top speed governor and could, for example, be set to control the speed of the high pressure shaft 21 at a value which was, say 3% above the maximum speed which the metering orifice 25 would theoretically allow the high pressure shaft 21 to attain.

As the speed of the low pressure shaft 22 respectively rises and falls, the needle valve 33 is positioned by the actuator 47 so that the abutment 50 is moved towards the limit stop 54 and the limit stop 53 respectively.

The provision of the limit stop 53 prevents the needle valve 33 from closing the control orifice 32 beyond a given extent, and therefore puts a limit on the possible pressure drop across the control orifice 32. This ensures that, in operation, the supply of fuel to the combustion equipment 15 cannot be reduced to such an extent that the speed of the high pressure shaft 21 will fall below a second given value (e.g. 85–95% of its maximum speed). This is necessary so as to ensure that the speed of the high pressure shaft 21 will not be allowed to be unduly low at take-off, at which time full fuel flow is being employed.

Movement of the needle valve 33 to reduce the area of the control orifice 32 will reduce the engine speed at which the control orifice 32 and spill valve 35 act as a governor, thus enabling the speed of the low pressure shaft 22, or the jet pipe temperature $T_7$, to be reduced below a value permitted by the metering orifice 25.

The needle valve 33 may be formed to be comparatively light, and the forces due to the fuel flow on it may be arranged to be almost constant. Moreover, the travel of the needle valve may be arranged to be quite small, e.g. less than half an inch. Consequently, the needle valve 33 can give a high rate of response.

Thus the governor constituted by the parts 32, 33, 35 governs a predetermined engine variable, namely high pressure shaft speed, independently of the fuel supply control unit. The "dumping" action of spill valve 35 is not in conflict with the control exercised by the orifice 25 of the fuel supply control unit, since the authority of the spill valve 35 is limited to engine condition in which the high pressure shaft speed is greater than the second given value (85–95% of maximum). The governor is also responsive to other engine variables, i.e. low pressure shaft speed and jet pipe temperature $T_7$, due to the control of actuator 47.

The governor constituted by the parts 32, 33, 35, does not involve the provision of a mechanical drive and can therefore be mounted in any convenient position, and need not necessarily be mounted near the pump 31 as shown. It can thus, if desired, be disposed adjacent to the metering orifice 25 of the fuel supply control unit so as in effect to form part of the latter and may use a common spill conduit 34.

In FIGURE 2 there is shown a modification of the fuel system of FIGURE 1, inasmuch as a control orifice 55 is employed the area of which is controlled by a movable valve member 56. The movable valve member 56 is arranged to move at right angles to, as opposed to in the same direction as, the direction of flow of the fuel. Such an arrangement is less responsive to the effect of forces acting on the needle valve 33 than is the arrangement of FIGURE 1.

If desired, means (not shown) may be provided for adjusting the position of the needle valve 33 or of the valve 56 so as to allow for a change of density of the fuel being employed, due to a change in the temperature thereof. This could, for example, be achieved by mounting the orifice 32 or the needle valve 33 on a bimetallic assembly or on a capsule filled with a liquid of high coefficient of thermal expansion.

I claim:

1. In a gas turbine engine fuel system having a fuel pump which is responsive to engine speed, a main fuel conduit means connecting said pump to said engine for carrying fuel flow to the engine, and a fuel supply control unit included in said main conduit means and having a variable metering orifice for controlling the flow of fuel to the engine in accordance with a plurality of different variables, the improvement in said fuel supply control unit comprising:
   a governor means for controlling fuel flow in said main fuel conduit to the engine independently of said variable metering orifice to govern a predetermined engine variable during its upper limits of operation to a value not exceeding a first given value,
   means for communicating said predetermined engine variable to the governor means as a fluid pressure signal,
   adjustment means for adjusting the governor means so that the fuel control exercised thereby is responsive to at least one other engine variable, and
   stop means which engage the adjustment means for limiting the adjustment of the governor so that the value of said predetermined engine variable cannot fall below a second given value under the action of the governor alone.

2. A fuel system as claimed in claim 1 wherein said fuel pump is a positive displaecment fuel pump driven by said engine, and wherein said governor means comprises a spill conduit which communicates with said main fuel conduit and through which a part of the main fuel flow may pass back to the low pressure side of the pump, and a spill valve which controls flow through said spill conduit in response to the pressure produced by the fuel pump.

3. A fuel system as claimed in claim 2 in which the governor means further comprises a control orifice through which passes the flow from said pump, the spill valve controlling the flow through the spill conduit in accordance with the value of the pressure drop across the control orifice, and the spill conduit receiving fuel which has passed through the control orifice.

4. A fuel system as claimed in claim 2 in which the spill conduit communicates with the downstream side only of the variable metering orifice.

5. A fuel system as claimed in claim 3 in which the spill valve is urged by resilient means towards the closed position and has two oppositely disposed pressure surfaces one of which is open to the pressure on the upstream side of the control orifice, which pressure tends to move the spill valve towards the open position, the other pressure surface being open to the pressure on the downstream side of the control orifice.

6. A fuel system as claimed in claim 3 in which the governor adjustment means comprise means for adjusting the size of the control orifice.

7. A fuel system as claimed in claim 6 in which the means for adjusting the size of the control orifice comprises a control valve, the said limit means limiting travel of the control valve.

8. A fuel system as claimed in claim 7 in which the control valve is provided with an abutment which is disposed between and is engageable selectively with two limit stops.

9. A fuel system as claimed in claim 7 in which the control valve is positioned by an actuator which is responsive to the said at least one other variable.

10. A fuel system as claimed in claim 9 in which the actuator is responsive to the rotational speed of a low pressure shaft of the engine, said shaft carrying a low pressure compressor and a low pressure turbine, the pump being driven by a high pressure shaft of the engine, which shaft carries a high pressure compressor and a high pressure turbine.

11. A fuel system as claimed in claim 10 in which the actuator is also responsive to at least one engine temperature.

12. A fuel system as claimed in claim 9 in which the actuator is an electronic actuator which receives signals representative of the value of at least one variable, means being provided for advancing the phase of said signals so that the control valve is moved in accordance with said phase-advanced signals.

References Cited

UNITED STATES PATENTS

| | | | |
|---|---|---|---|
| 2,644,513 | 7/1953 | Mock | 60—39.28 X |
| 2,705,047 | 3/1955 | Williams et al. | 60—39.28 X |
| 2,856,754 | 10/1958 | Torrell | 60—39.28 |

JULIUS E. WEST, *Primary Examiner.*